Feb. 5, 1957 N. C. PRICE 2,780,424
AIRPLANE FOR VERTICAL TAKE-OFF IN HORIZONTAL ATTITUDE
Filed Oct. 19, 1951 5 Sheets-Sheet 1

*INVENTOR.*
NATHAN C. PRICE
BY
*George Sullivan*
Agent

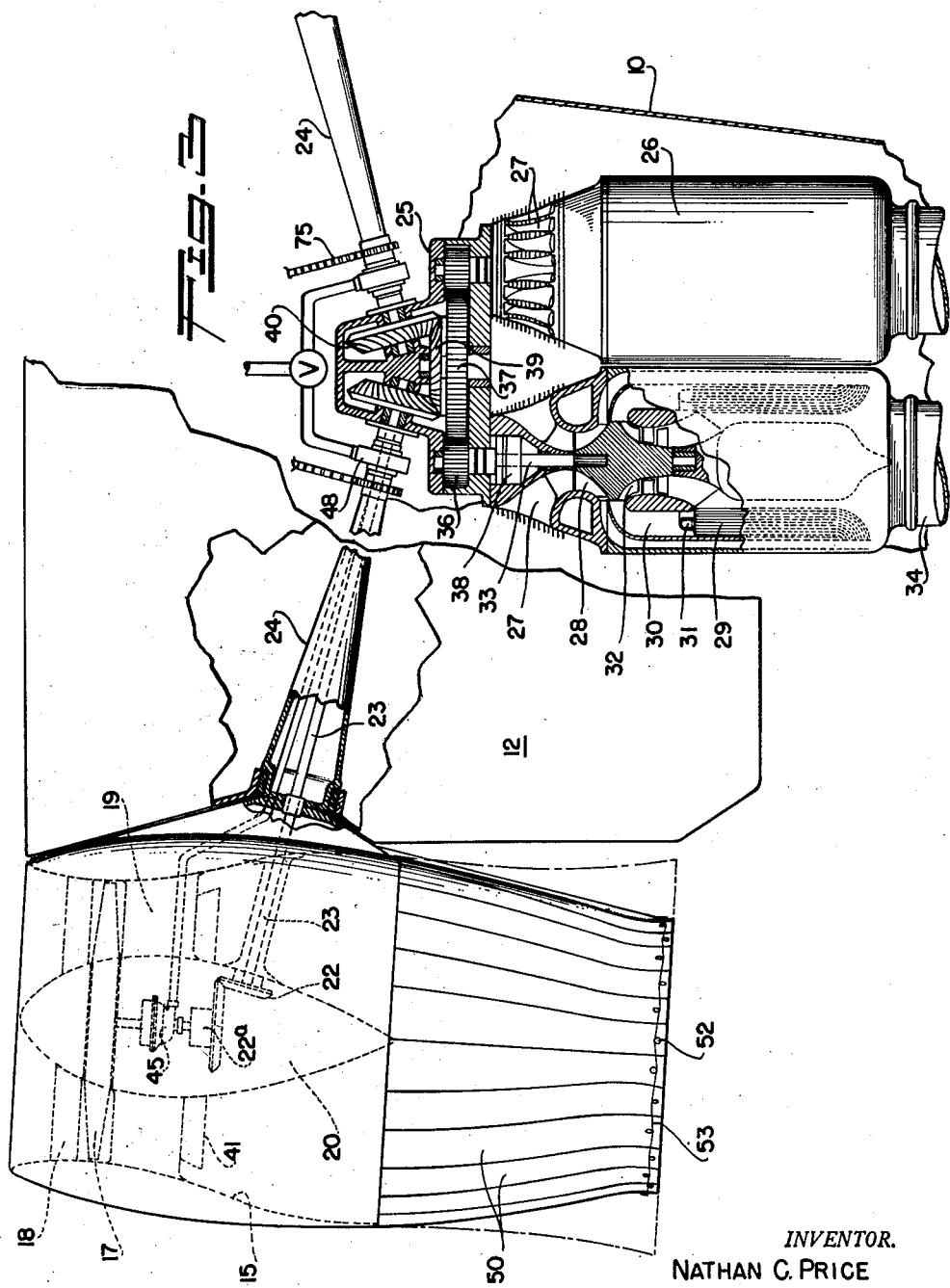

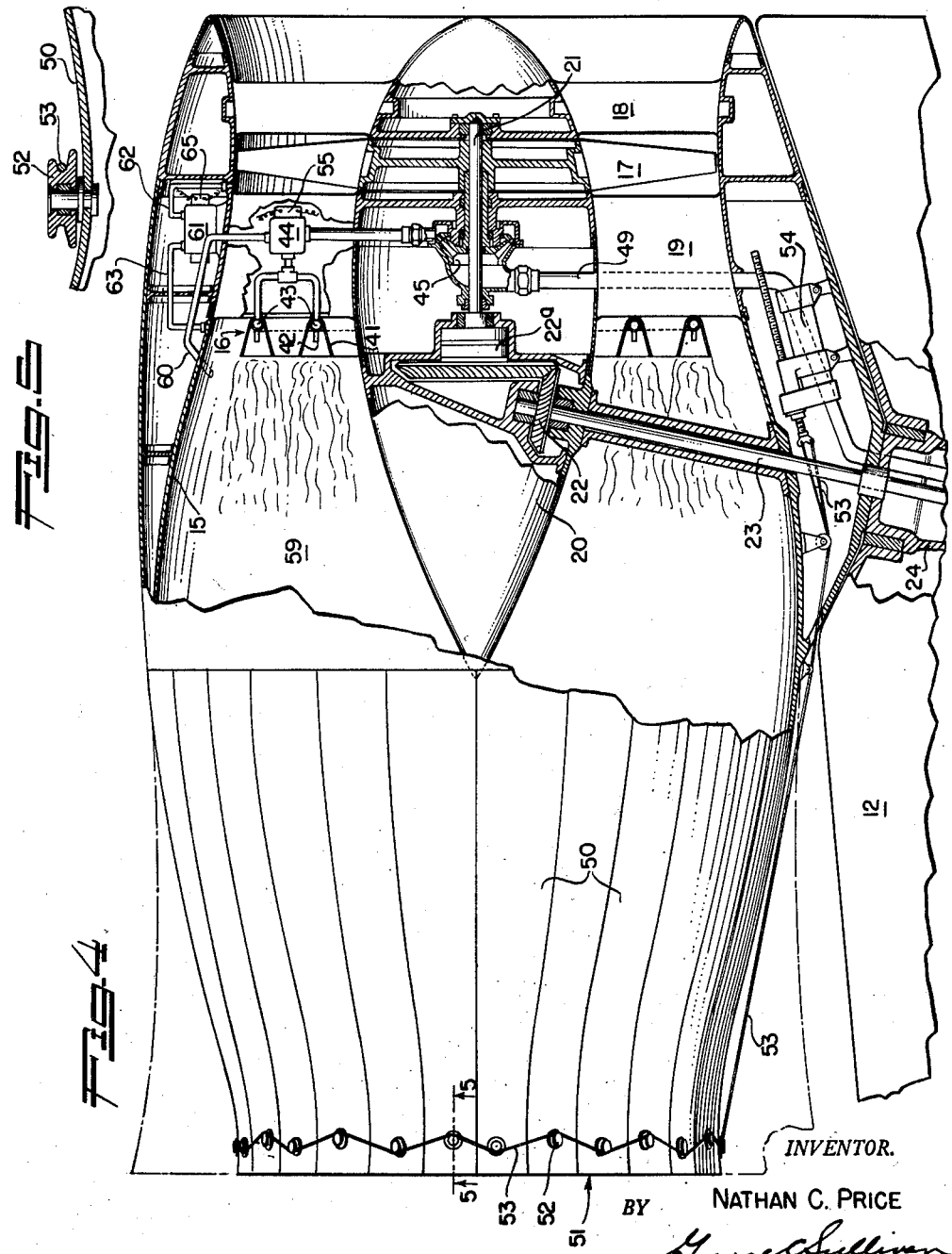

Feb. 5, 1957   N. C. PRICE   2,780,424
AIRPLANE FOR VERTICAL TAKE-OFF IN HORIZONTAL ATTITUDE
Filed Oct. 19, 1951   5 Sheets-Sheet 4

INVENTOR.
NATHAN C. PRICE
BY
*George C. Sullivan*
Agent

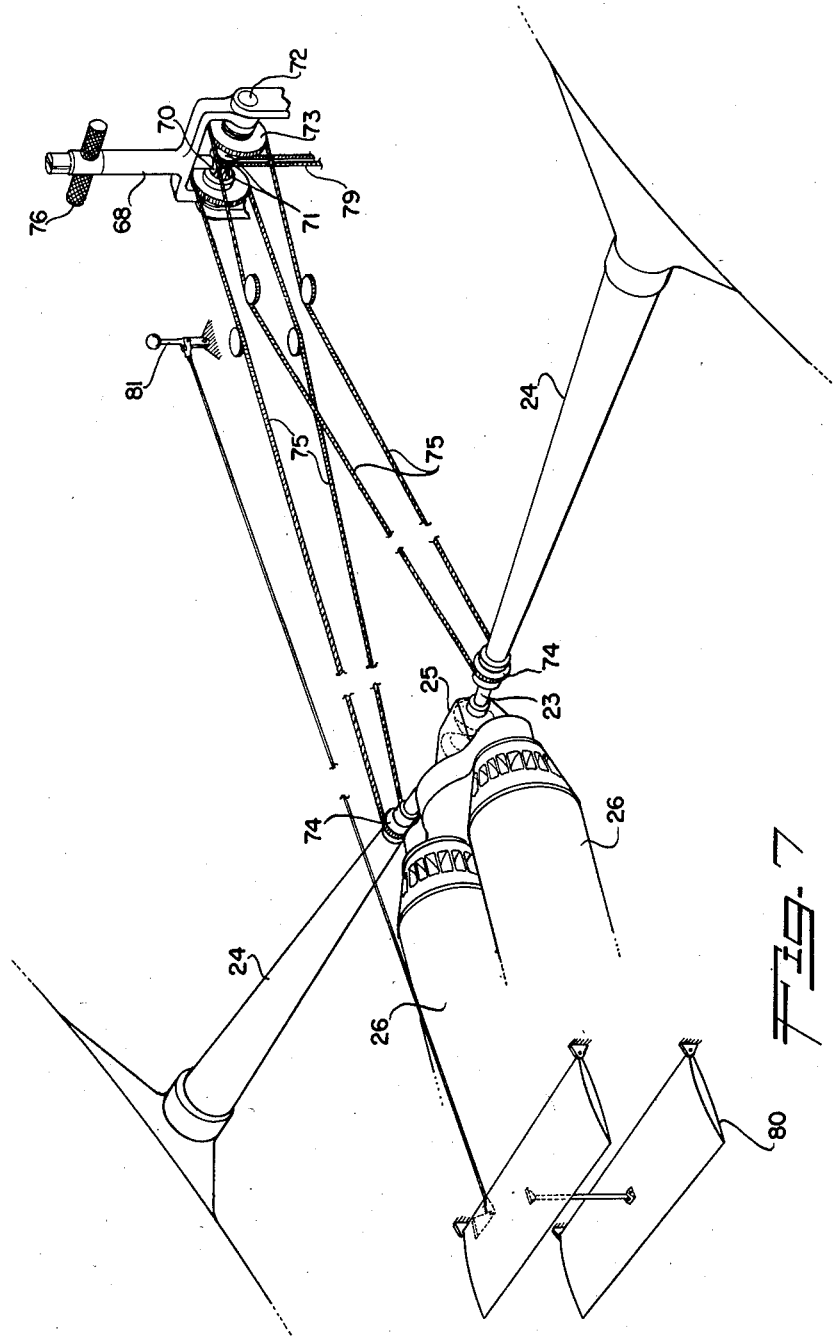

United States Patent Office 2,780,424
Patented Feb. 5, 1957

2,780,424

AIRPLANE FOR VERTICAL TAKE-OFF IN HORIZONTAL ATTITUDE

Nathan C. Price, Hollywood, Calif., assignor to Lockheed Aircraft Corporation, Burbank, Calif.

Application October 19, 1951, Serial No. 252,147

8 Claims. (Cl. 244—12)

This invention relates to an airplane embodying a turbojet power plant driving ducted compressors swivelingly mounted at each wing tip, the ducted compressors incorporating fuel burners to temporarily augment the total power suffciently to provide direct or vertical take-off and hovering, when the ducted compressors are turned to produce upward lifting thrust exceeding the gross weight of the airplane.

While airplanes with centrally mounted power plants driving outboard or wing mounted propellers having adjustable thrust axes have been proposed heretofore, no such proposals were workable for direct or vertical take-off and hovering with the airplane longitudinal axis remaining substantially parallel to the ground, both for lack of adequate static lift and because no provision could be made for horizontal trim or pitch control under vertical take-off or hovering conditions. It is accordingly an object of my present invention to provide adequate static thrust for direct take-off and hovering and at the same time to provide adequate and controllable stability during such performance and during the transition to or from aerodynamically sustained forward flight as a conventional airplane.

It is also an object of this invention to provide an airplane of the type described wherein pivoted wing tip ducted compressors provide for direct vertical take-off with the airplane longitudinal axis horizontal and in which the ducted compressors are, in effect, ram jets where necessary airflow and pressure is supplied by power driven compressors whereby the combination of ducted compressors and fuel burners provide adequate static thrust for take-off, hovering and landing, without forward motion of the airplane itself.

It is a further object of this invention to provide ducted compressors swivelingly mounted at the wing tips together with a differential and/or simultaneous control of the swiveling motion of the ducted compressors whereby to utilize the discharge from the compressors for aileron and elevator controls to control lateral and longitudinal balance with the airplane fuselage maintained substantially horizontal while the latter is moving either vertically or in normal flight.

It is another object of this invention to provide a ducted compressor arrangement of the type described wherein the compressors are driven from a plurality of turbine powerplants centrally grouped and provided with coupling means in the drive permitting the disconnection and reconnection of individual turbine powerplants during flight.

It is also an object of the invention to provide a ducted compressor arrangement of the type described wherein the compressors are driven through a free-wheeling or one-way coupling whereby the compressors can freewheel in the event the ram air velocity in the ducts therefor tends to drive the compressors.

It is a further object of this invention to provide a ducted compressor of the type described wherein the exit area of the duct is automatically varied in size according to the differential pressures developed in the compressor diffuser and the fuel pressures in the fuel burner associated therewith.

Other and further objects of this invention will become apparent as the detailed description of a selected embodiment thereof proceeds; throughout which description reference will be made to the accompanying drawings, wherein:

Figure 3 is a fragmentary schematic drawing of the powerplants and the drive therefrom to the ducted compressors, partly broken away to show details thereof;

Figure 4 is an enlarged longitudinal view of one of the ducted compressors broken away to show details of the compressor and fuel burner controls;

Figure 5 is a fragmentary detail of the tail pipe adjustment taken on the line 5—5 of Figure 4;

Figure 7 is a schematic diagram of the airplane control stick arrangement for differential and simultaneous control of the thrust axes of the ducted compressors.

As shown in the drawing:

Figure 1:
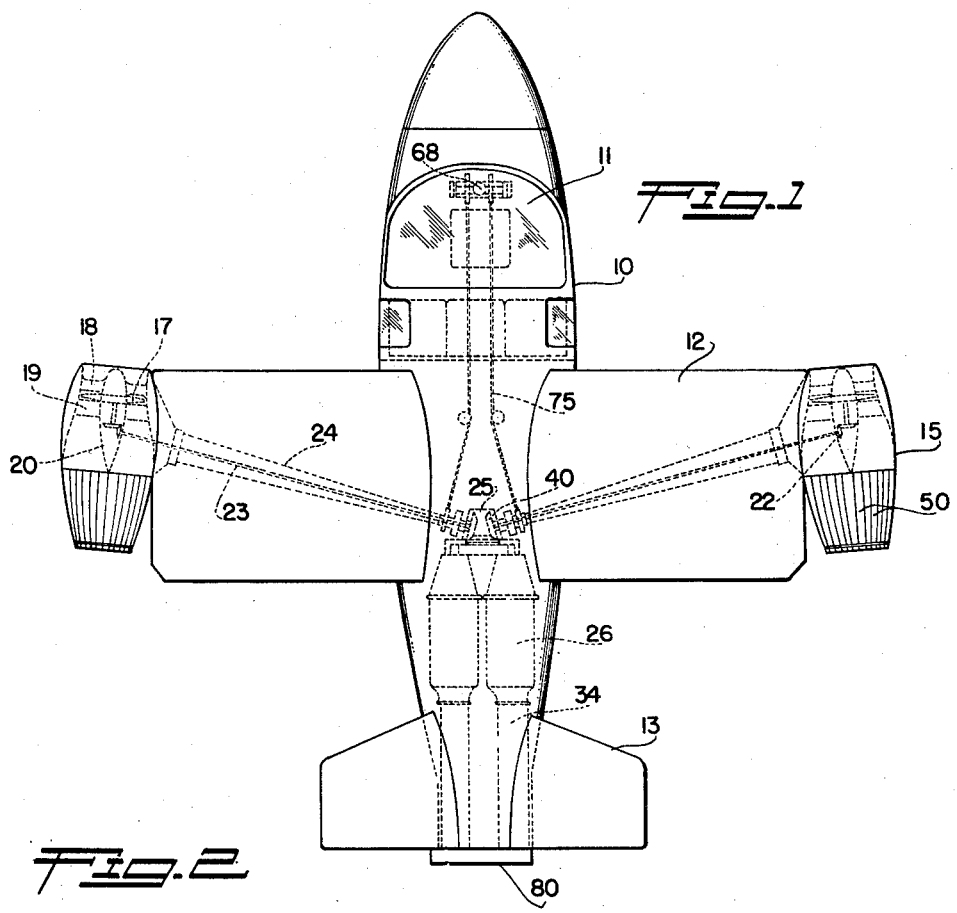
Figure 1 is a top or plan view of an airplane embodying the features of this invention, the power plants, ducted compressor drives and controls being schematically shown in dotted lines.
Figure 2:
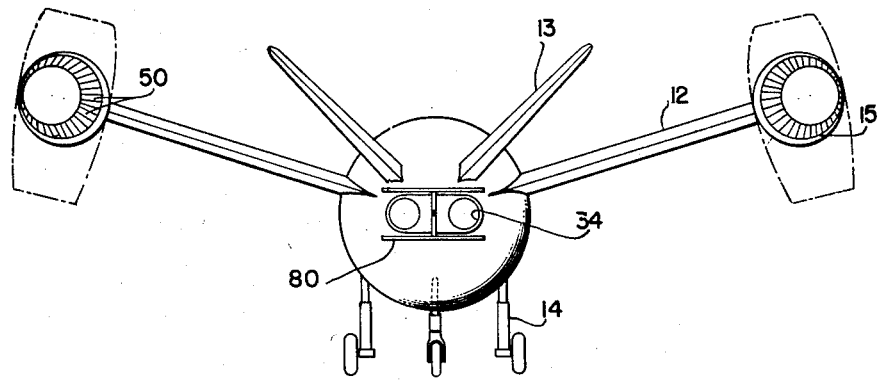
Figure 2 is a rear view of Figure 1, the take-off position of the ducted compressors being shown in dotted lines.

I have chosen to illustrate my invention as incorporated in an aircraft of somewhat conventional airplane outline, comprising a fuselage 10 having a forward pilot and passenger cockpit 11, fixed wings 12, V type rear stabilizers 13 and landing gear 14. The wings 12 are given an unusual amount of dihedral, for reasons that will become apparent as the description proceeds.

This invention is primarily concerned with a powerplant system providing for vertical take-off and horizontal propulsion of the airplane, wherein the vertical take-off is made with the airplane longitudinal axis substantially horizontal, transition to horizontal flight being accomplished as the forward speed increases sufficiently to bring aerodynamic forces into play as in conventional airplanes. To accomplish this I provide ducts 15 containing compressors, hereinafter referred to as ducted compressors, pivotally mounted at the wing tips whereby the thrust axes of the ducted compressors can be adjusted through a range from approximately horizontal to somewhat beyond vertical, and provide fuel burners 16 to augment the thrust of the ducted compressors, primarily for use during the periods of vertical ascent, hovering, and descent; under which conditions no aerodynamic lift is obtained from the airfoil surfaces of the airplane.

The ducted compressors referred to may be likened to a ram jet where the "ram" air is supplied by a power driven axial blower or compressor 17 having guide vanes 18 on the entrance side thereof and diffuser vanes 19 on the discharge side, the diffuser vanes supporting a central island 20 containing a shaft 21 and gearing 22 for driving the compressor 17. An overrunning clutch 22ª is interposed between the gearing 22 and the compressor, to permit freewheeling of the latter in the event of power failure. A shaft 23 leads from a powerplant, to be later described, and coaxial with the axis of the complete ducted compressor 15, which is mounted on a spindle member 24 suitably supported interiorly of the wing and to which is attached the pilot's control for adjusting the thrust axis or center line of the ducted compressor. The wing diehedral angle previously mentioned causes the jets to spread out, when the ducted compressor is nearly vertical, to prevent ground effects from deflecting the jet back up against the airplane wings and fuselage, and also to increase the lateral stability on take-off or landing; and the axes of the shafts 23 and spindles 24 are also swept forward in the planes of the wings to give a toe-out effect to the jets when the ducted compressor axes approach parallelism with the horizontal or longitudinal axis of the airplane. The latter effect improves directional stability.

The shafts 23 lead to a gear box 25 associated with two or more powerplants 26 of the turbo-compressor type primarily designed for power take-off rather than jet propulsion. The particular powerplant chosen for illustrative purposes comprises an annular air intake 27, a compressor 28 discharging into a heat exchanger 29, an annular combustion chamber 30 with fuel injection arrangements at 31 and a two-stage turbine 32, the turbine and compressor being mounted on a shaft 33 leading into the gear box 25. The turbine exhaust is connected to a tail pipe 34. This particular design of turbo compressor powerplant is more fully described in my prior British Patent No. 642,585, issued July 6, 1950, entitled Power Plant, and forms no part of the present invention per se.

The powerplants are connected to the gear box 25 through the turbo shafts 33, which carry pinions 36 meshing with a central bull gear 37; the pinions 36 being engaged to the shaft 33 by a one-way clutch 38 with a hydraulic lock-up an example of a suitable clutch and lock-up being disclosed in the Bloomfield Patent No. 2,314,030. The bull gear 37 in the gear box 25 carries a bevel gear 39 driving bevel gears 40 attached to the shafts 23 which drive the compressors 17. The purpose of such individual one-way drive clutches is to allow one or more powerplants to carry the driving load, or conversely to permit one or more powerplants to be shut down, with the load being carried by the other or remaining powerplants under normal forward flight conditions; and the lock-up is desirable to permit restarting of a dead powerplant when full power is required, as for hovering or vertical descent.

The fuel burner 16, previously mentioned, is best shown in Figure 4 and comprises an annular pair of flame holder rings 41 protecting fuel injection nozzles 42 fed by pipes 43 in the holders. The flame holders 41 and pipes 43 are attached to the rear of the diffuser vanes 19; and fuel is fed to the pipes 43 through a control cylinder 44 from a centrifugal pump 45 driven by the compressor shaft 21. Fuel is supplied to the pump 45 from tankage (not shown), under the control of pilot operated valves 46 which feed through pipes leading to swivel joints 48 surrounding the drive shafts 23 at the inner ends of the spindles 24, and thence through pipes 49 through the spindles 24, to and through a diffuser vane to the island 20 and pump 45.

The jet or exhaust end of the ducted compressor duct 15 is formed as a series of overlapping strips 50 of metal which can be adjusted to vary the exit area of the jet nozzle or orifice 51 by pulling the ends of the strips together to form the nozzle shown in full lines in Figure 4 for best operation of the ducted compressor with the fuel burner 16 shut down. With the fuel burner in full operation, together with the maximum power applied to the compressor 17, the nozzle 51 is allowed to open up to the dotted line position of Figure 4 by automatic controls schematically shown in Figure 6; to be now described.

Figure 6:
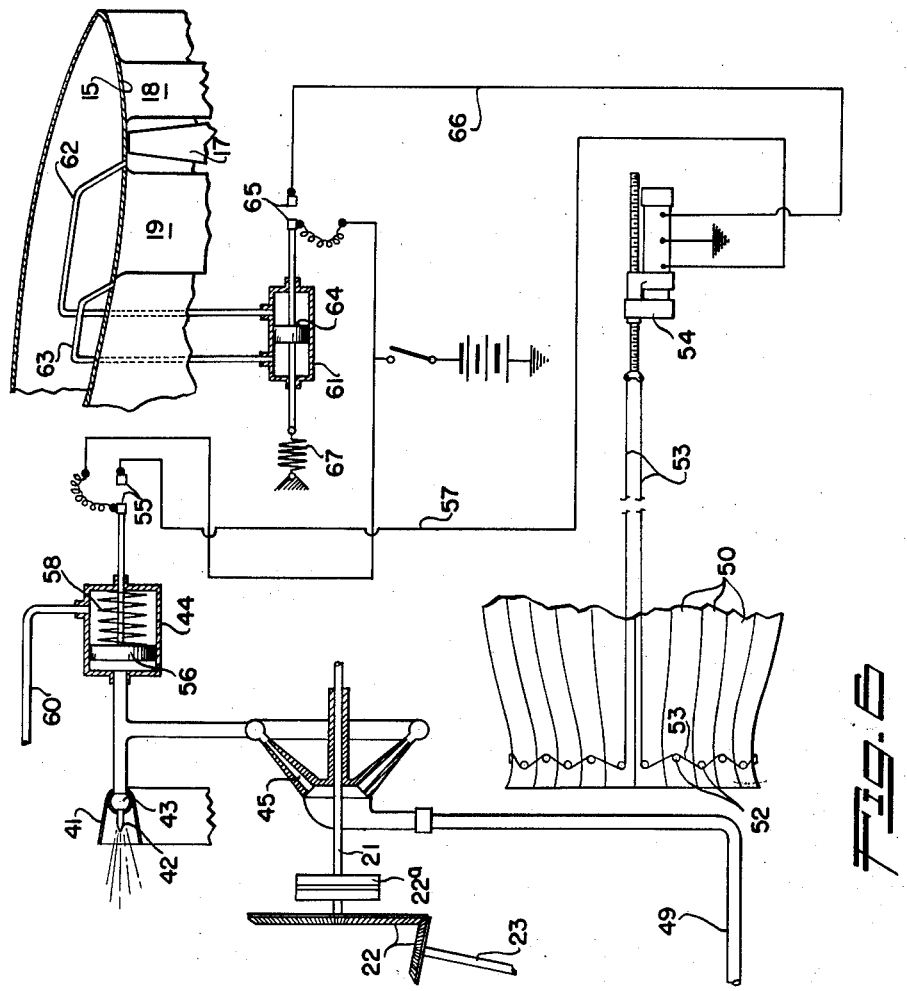
Figure 6 is a schematic diagram of the airplane control stick and its control arrangements for the fuel burner.

The strips 50 carry small cable pulleys 52 near their rear or free ends, as shown in the detail of Figure 5, and a drawstring or cable 53 is led past on opposite sides of alternate pulleys and then to a reversible electric actuator 54. This actuator 54 is energized to the nozzle opening position by an electric contact 55 operated by a differential pressure responsive piston 56 in the control cylinder 44, the left side of the piston being exposed to fuel pressures from the pump 45 which tends to push the piston 56 to the right to close the contact 55 and energize the actuator in the nozzle opening direction through the wire 57. Such movement of the piston is opposed by a return spring 58 supplemented by pressure in the combustion chamber 59 acting through a tube 60. In effect, this control opens up the nozzle in accordance with the amount of fuel burning, and a separate control is used to regulate the closing movement of the nozzle 51. This is accomplished by sensing the pressure rise through the diffuser vanes 19. As shown in Figure 6, a second control cylinder 61 has its opposite ends connected to tubes 62 and 63 open respectively ahead of and behind the diffuser vane area of the compressor section. Thus increased pressure in the tube 63 leading to the left side of a piston 64 in the cylinder 61 will tend to move the piston towards the right to close a contact 65 with a wire 66 leading to the nozzle closing movement of the actuator 54, in the direction reverse to that of the fuel burner control. A return spring 67 attached to the piston serves to define a predetermined pressure differential between the areas sensed by the tubes 62 and 63, below which differential the compressor part of the nozzle control is inoperative.

The angular position of the thrust axis of the ducted compressors is manually controlled by the pilot for either differential or simultaneous movements thereof by a pilot's control column 68 which is hinged at the bottom for fore and aft motion, and carries an inner tube 69 pivoted for rotary motion in the column. The lower end of the tube 69 carries a bevel pinion 70 meshing between a pair of bevel gears 71 journaled on a shaft 72 which also forms the pivot axis of the column, so that fore and aft motion of the column, with the tube stationary therein produces equal motions of the gears 71 in the same direction as the column motion, while rotation of the tube 69 causes equal and opposition movements of the gears 71. Both motions can of course be combined to produce a greater motion of one gear relative to the other in the same or opposite directions. The gears 71 each carry sprockets 73 which are connected to sprockets 74 on the ducted compressor spindles 24 by chains 75 whereby movements of the bevel gears 71 result in corresponding movements of the thrust axes of the ducted compressors.

The control column tube 69 is provided with a pair of handles 76 which may be used to move the column 68 or turn the tube 69. The handles are separately journaled in the tube to turn on their axes, and carry pinions 77 meshing with racks 78 slidable in the tube, the racks 78 being connected to the fuel burner pilot valves 46 by Bowden wires 79 for separate or simultaneous control of the fuel supply to each fuel burner. Variation of the fuel supplied to the fuel burners provided a variation of thrust that provides a turning or rudder effect when the thrust axes of the ducted compressors are approximately parallel to the wing planes, and gives lateral control when the thrust axes are at appreciable angles to the wing planes.

The powerplants 26 are designed for maximum shaft take-off power, so that the exhaust jets issuing from the tail pipes are of reduced velocity contributing little forward thrust at normal forward speeds. However, during vertical take-off and landing the exhaust thrust may be utilized to control the longitudinal stability of the airplane by providing exhaust deflectors 80, operated by a separate lever 81 adjacent the pilot's position.

In the operation of the airplane of this invention, which is capable of true vertical take-off and landing or stationary hovering, it necessarily follows that full power to the compressors 17 plus full power from the fuel burners must develop sufficient static thrust from the vertically positioned ducted compressors to overcome the gross weight of the airplane. Such maximum thrust is used only during vertical take-off involving a matter of seconds, and during the transition to level flight or normal aerodynamic climb the ducted compressor axes are moved to approximate parallelism with the wing chords while the fuel burner fuel is being gradually reduced and finally cut off when sufficient speed has been attained for aerodynamic sustentation. When normal cruising speeds are reached flight can be sustained on much less than full power from all the powerplants 26 so that if two are used one may be shut down, whereupon its clutch 38 disconnects said powerplant. The clutch lock-up may later be used to restart the dead powerplant, prior to hovering or vertical descent.

For vertical take-off, the axes of the ducted compressors are set vertical, the powerplants started in the normal manner and brought up to full power and speed. This produces maximum air flow through the compressors 17 but the thrust is inadequate to lift the airplane. Turning on the fuel burners 16 greatly augments the thrust from the ducted compressors, and thus produces adequate thrust for vertical take-off without ground run. However, the static thrust from the power plants, operating at maximum rating, would tend to impose a forward velocity to the airplane, so that if a truly vertical take-off is desired the axes of the ducted compressors are adjusted past the vertical to give a rearward horizontal component of thrust sufficient to neutralize the forward thrust from the powerplants. In either case the exhaust deflectors 80 may be used to aid in maintaining longitudinal trim, and the individual adjustments of fuel to each fuel burner provides for lateral control by the pilot's differential rotation of the handles 76 on their axes in the tube 69. It is also possible to longitudinally balance the airplane by means of the pilot's control of the ducted compressor axes, since variation of the thrust angles thereof can be used to lift the airplane nose or tail as may be required for balance.

As brought out in the detailed description of the control, the pilot's control column 68 is moved fore and aft to simultaneously control the thrust axes of the ducted compressors through the gears 71 and chain drive to the spindles 24; and rotation of the tube 69 and its pinion 70 produces an equal and opposite movement of the gears 71, which may be modified as desired by column motions; in other words one ducted compressor may remain stationary while all the differential motion is applied to adjustment of the axis of the other ducted compressor. The pilot's handles 76 concentrate these controls, and in addition control the fuel to the fuel burners 16, as previously described.

The ducted compressor and fuel burner combination is arranged to automatically compensate for the wide variations in nozzle area required throughout the range of operating conditions. With full power to the compressors and full operation of the fuel burners, the fuel burner fuel pressure opens up the adjustable exhaust nozzle to its maximum extent, by the control cylinder previously described. Reduction of or shutting off the fuel burner fuel reduces the back pressure on the compressor section and thus tends to operate the draw-string control in a direction to decrease the area of the exhaust nozzle; this nozzle area further decreasing as the power from the powerplants 26 is decreased. In the event of total power failure the overrunning clutch 22ª on the compressor shaft 21 between the gearing 22 and the compressor 17 allows the latter to free wheel and thus allows the ram effect to supply air to the fuel burner; or at least to reduce the drag of the compressors in the event of an emergency power off landing, which would be made as a normal airplane, in a gliding approach to the field.

It will thus be seen that I have invented an improved airplane involving a combination of conventional airfoil lifting surfaces with directionally adjustable ducted compressors in combination with fuel burners capable of lifting the airplane in its normal horizontal attitude either directly or nearly directly, following which take-off the ducted compressors are gradually adjusted to produce a smooth transition to horizontal flight, and are capable of maintaining such flight on partial power without using the fuel burners.

Having described only a typical form of the invention I do not wish to be limited to the specific details herein set forth, but wish to reserve to myself any variations or modifications that may appear to those skilled in the art and fall within the scope of the following claims.

I claim:

1. In an aircraft adapted for generally vertical take-off and descent and generally horizontal flight the combination of; an airframe having an upper surface, a lower surface and a lateral extremity, a reactive jet propulsion unit at said extremity including a tubular casing varying in internal cross-sectional area to have an inlet at one end and an outlet nozzle at its other end, and a ducted compressor operable in the casing to produce a unidirectional airflow through the casing which discharges from the nozzle in the form of a propulsive jet, cantilever means pivotally supporting the unit on said extremity, power plant means in the airframe driving said compressor and producing a reactive jet which discharges aft from the airframe, means to pivot said unit between a position where said nozzle faces substantially aft for generally horizontal flight and a position where said nozzle faces generally downward for substantially vertical propulsion, and a deflector movable to act upon said reactive jet of the power plant means to aid in maintaining trim of the aircraft.

2. In an aircraft adapted for generally vertical take-off and descent and generally horizontal flight the combination of; an airframe having an upper surface, a lower surface and a lateral extremity, a reactive jet propulsion unit at said extremity including a tubular casing varying in internal cross-sectional area to have an inlet at one end and a variable area outlet nozzle at its other end, means for varying the cross sectional area of the outlet nozzle, a compressor in the inlet region of the casing including stator blades and rotatable rotor blades, cantilever means in the airframe pivotally supporting said unit on said extremity, a power plant in the airframe, shaft means driven by the power plant and extending through said cantilever means to drive said rotor blades, fuel burner means in the casing aft of the compressor to add propulsive energy to the propulsive air stream and jet created by the compressor, means delivering fuel to the burner and also extending through said cantilever means, and means for pivoting said unit between a position where said nozzle faces aft for generally horizontal flight and a position where said nozzle faces downwardly for generally vertical flight.

3. An aircraft adapted for generally horizontal flight and generally vertical ascent and descent comprising an airframe having aerodynamic upper and lower surfaces terminating at two outboard extremities, a ducted compressor-ramjet propulsive unit at each of said extremities comprising a tubular casing having a ram inlet at one end and a propulsive nozzle having a variable area exit, means operable to very the effective area of the nozzle exit, a bladed compressor operable in the inlet region of the casing, and a fuel burner in the casing aft of the compressor, means mounting said units at said extremities for pivotal movement, means supplying fuel to said burners, power plant means in the airframe driving said compressors, said units operating as ram jets to propel the aircraft when said power plant means is idle or inoperative, and means for pivoting the units between positions where their nozzles face generally aft and positions where their nozzles face generally downwardly.

4. An aircraft adapted for generally horizontal flight and generally vertical ascent and descent comprising an airframe having aerodynamic upper and lower surfaces terminating at two outboard extremities, a ducted compressor-ramjet propulsive unit at each of said extremities comprising a tubular casing having a ram inlet at one end and a propulsive nozzle at the other end having a variable area exit, means operable to vary the area of said nozzle exit, a bladed compressor operable in the inlet region of the casing, and a fuel burner in the casing aft of the compressor, means mounting said units at said extremities for pivotal movement, means supplying fuel to said burners, power plant means in the airframe driving said compressors, said units operating as ram jets to propel the aircraft when said power plant means is idle or inoperative, and a unitary pilot operated means for producing similar as well as differential pivoting of the units between positions where their nozzles face generally aft and where their nozzles face generally downwardly.

5. An aircraft adapted for generally horizontal flight and generally vertical ascent and descent comprising an airframe having aerodynamic upper and lower surfaces terminating at two outboard extremities, a ducted compressor-ramjet propulsive unit at each of said extremities comprising a tubular casing having a ram inlet at one end and a propulsive nozzle at the other end having a variable area exit, means operable to vary the area of said nozzle exit, a bladed compressor operable in the inlet region of the casing, and a fuel burner in the casing aft of the compressor, means mounting said units at said extremities for pivotal movement, means supplying fuel to said burners, power plant means in the airframe driving said compressors, said units operating as ram jets to propel the aircraft when said power plant means is idle or inoperative, and a unitary pilot operated means for controlling said fuel supply means and for producing similar as well as differential pivoting of the units between positions where their nozzles face generally aft and where their nozzles face generally downwardly.

6. An aircraft adapted for generally horizontal flight and generally vertical ascent and descent comprising an airframe having aerodynamic upper and lower surfaces terminating at two outboard extremities, a ducted compressor-ramjet propulsive unit at each of said extremities comprising a tubular casing having a ram inlet at one end and a propulsive nozzle at the other end having a variable area exit, means operable to vary the area of said nozzle exit, a bladed compressor operable in the inlet region of the casing, and a fuel burner in the casing aft of the compressor, cantilever means supporting said units at said extremities for pivotal movement between positions where said inlets and nozzles face generally fore and aft and positions where the inlets are outboard of the air regions above the adjacent upper surfaces and the outlets are outboard of the air regions below the lower surfaces, power plant means in the airframe to drive the compressors, a system supplying fuel to said burners, said units operating as ram jets when the power plant means is idle, and a single pilot-station means for correspondingly and differentially pivoting the units and controlling said system.

7. An aircraft adapted for generally horizontal flight and generally vertical ascent and descent comprising an airframe having aerodynamic upper and lower surfaces terminating at two outboard extremities, a ducted compressor-ramjet propulsive unit at each of said extremities comprising a tubular casing having a ram inlet at one end and a propulsive nozzle at the other end having a variable area exit, means operable to vary the area of said nozzle exit, a bladed compressor operable in the inlet region of the casing, and a fuel burner in the casing aft of the compressor, cantilever means supporting said units at said extremities for pivotal movement between positions where said inlets and nozzles face generally fore and aft and positions where the inlets are outboard of the air regions above the adjacent upper surfaces and the outlets are outboard of the air regions below the lower surfaces, power plant means in the airframe to drive the compressors, a system supplying fuel to said burners, said units operating as ram jets when the power plant means is idle, means responsive to pressures in the casings controlling fuel flow to their respective burners, and a single pilot-station means for correspondingly and differentially pivoting the units and controlling said system.

8. In an aircraft the combination with an airframe having an outboard extremity and upper and lower aerodynamic surfaces extending thereto; a propulsive unit at said extremity comprising an exteriorly streamlined tubular casing having a ram inlet at one end, an internal combustion chamber of increased diameter and a propulsive nozzle at the other end having a variable area exit, means operable to vary the area of said nozzle exit, rotatable compressor blading in the casing adjacent the inlet operable to produce a unidirectional propulsive airflow through the casing which discharges from the nozzle, a fuel burner in the casing aft of the blading, tubular cantilever means supporting the unit at said extremity for pivotal movement between a position where the nozzle faces aft and a position where the nozzle faces downwardly, shaft means extending through the cantilever means to drive the compressor blading, and fuel supply means extending through the cantilever means to supply fuel to the burner.

References Cited in the file of this patent

UNITED STATES PATENTS

| Re. 23,198 | Anxionnaz et al. | Feb. 21, 1950 |
| 1,824,250 | Wells | Sept. 22, 1931 |
| 1,869,326 | Ludlow | July 26, 1932 |
| 1,886,932 | Anderson | Nov. 8, 1932 |
| 2,230,370 | Baynes | Feb. 4, 1941 |
| 2,284,902 | Hosford | June 2, 1942 |
| 2,396,745 | Nallinger et al. | Mar. 19, 1946 |
| 2,450,821 | Zimmerman | Oct. 5, 1948 |
| 2,518,498 | Schulte | Aug. 15, 1950 |
| 2,580,962 | Sedille | Jan. 1, 1952 |
| 2,584,961 | Beck et al. | Feb. 5, 1952 |
| 2,597,253 | Melchior | May 20, 1952 |
| 2,603,062 | Weiler et al. | July 15, 1952 |
| 2,603,945 | Brown | July 22, 1952 |
| 2,619,795 | Drake | Dec. 2, 1952 |
| 2,632,300 | Brzozowski | Mar. 24, 1953 |
| 2,641,105 | Drake | June 9, 1953 |
| 2,688,841 | Decher et al. | Sept. 14, 1954 |

FOREIGN PATENTS

| 940,824 | France | Dec. 24, 1948 |
| 941,556 | France | July 19, 1948 |

OTHER REFERENCES

"Popular Science" Publication, April 1949, pp. 140 and 141.